(12) United States Patent
Bae et al.

(10) Patent No.: US 9,740,941 B2
(45) Date of Patent: Aug. 22, 2017

(54) APPARATUS AND METHOD FOR VISUALIZING LOITERING OBJECTS

(71) Applicant: HANWHA TECHWIN CO.,LTD., Changwon-si (KR)

(72) Inventors: Soonmin Bae, Changwon-si (KR); Mookyung Song, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 0 days.

(21) Appl. No.: 14/702,860

(22) Filed: May 4, 2015

(65) Prior Publication Data

US 2016/0117827 A1    Apr. 28, 2016

(30) Foreign Application Priority Data

Oct. 27, 2014    (KR) ........................ 10-2014-0146437

(51) Int. Cl.
*G06K 9/00* (2006.01)

(52) U.S. Cl.
CPC ................................ *G06K 9/00771* (2013.01)

(58) Field of Classification Search
CPC ..... G06K 9/00771; G06T 7/0044; G06T 7/20; G06T 2207/10016; G06T 2207/30196; G06T 2207/30232; G06T 2207/30241; H04N 7/188

See application file for complete search history.

(56) References Cited

U.S. PATENT DOCUMENTS

| | | | | |
|---|---|---|---|---|
| 2008/0304706 A1* | 12/2008 | Akisada | ............ | G06K 9/00771 382/103 |
| 2011/0157427 A1* | 6/2011 | Chang | .................. | H04N 5/2625 348/239 |
| 2011/0168877 A1* | 7/2011 | Hsu | ..................... | H04L 12/6418 250/221 |
| 2011/0243378 A1* | 10/2011 | Lee | ......................... | G06T 7/206 382/103 |
| 2012/0140982 A1* | 6/2012 | Sukegawa | .......... | G06K 9/00221 382/103 |
| 2012/0170803 A1* | 7/2012 | Millar | ................. | G06K 9/00771 382/103 |
| 2013/0321669 A1* | 12/2013 | Youngs | .............. | H04N 5/23293 348/240.99 |

FOREIGN PATENT DOCUMENTS

| | | |
|---|---|---|
| JP | 2010-166288 A | 7/2010 |
| KR | 10-2012-0004037 A | 1/2012 |
| KR | 10-2014-0045834 A | 4/2014 |
| KR | 10-2014-0075839 A | 6/2014 |
| WO | 2014/058165 A1 | 4/2014 |

* cited by examiner

*Primary Examiner* — Amara Abdi
(74) *Attorney, Agent, or Firm* — Sughrue Mion, PLLC

(57) ABSTRACT

A method for visualizing loitering objects includes: detecting at least one object determined to have been in a selected area of an input image for a preset time period; obtaining representative still images of each of the detected at least one object in respective time periods during the preset time period; and displaying the representative still images in a time order, or generating a video summary in which images of each of the detected at least one object, respectively included in the representative still images, are displayed together on a single image with indication of the time order.

18 Claims, 6 Drawing Sheets

APPARATUS AND METHOD FOR VISUALIZING LOITERING OBJECTS

CROSS-REFERENCE TO THE RELATED APPLICATION

This application claims priority from Korean Patent Application No. 10-2014-0146437, filed on Oct. 27, 2014, in the Korean Intellectual Property Office, the disclosure of which is incorporated herein in its entirety by reference.

BACKGROUND

1. Field

Apparatuses and methods consistent with exemplary embodiments relate to detection of loitering objects.

2. Description of the Related Art

A method of detecting loitering objects may be used to monitor in advance persons that plan to invade a particular area to prevent the occurrence of crimes that may be committed by the persons. However, since results of detecting loitering objects at particular periods of time are displayed on respective still screens, a relationship between the detected loitering objects may not be easily understood.

SUMMARY

One or more exemplary embodiments include a method of addressing such a problem that it may be difficult to utilize or analyze collected data when it is not figured out whether detected loitering objects are the same object.

Various aspects will be set forth in part in the description which follows and, in part, will be apparent from the description, or may be learned by practice of the presented embodiments.

According to one or more exemplary embodiments, there is provided a loitering visualization method which may include: detecting at least one object determined to have been in a selected area of an input image for a preset time period; obtaining representative still images of each of the detected at least one object in respective time periods during the preset time period; and performing at least one of displaying the representative still images in a time order and generating a video summary in which images of each of the detected at least one object, respectively included in the representative still images, are displayed together on a single image. The method may further include assigning an identifier to each of the detected at least one object, wherein the identifier is displayed along with each of the detected at least one object on the representative still images or on the single image of the video summary. The method may also further include tracking a path of each of the detected at least one object to which the identifier is assigned, In the generating the video summary, the images of each of the detected at least one object respectively included in the representative still images may be displayed on the single image with indication of the time order.

Each of the representative still images may display at least one of a front view, a side view, and a rear view of each of the at least one object.

The detected at least one object may be at least one object which has appeared more than a predetermined number of times in the selected area for the preset time period.

BRIEF DESCRIPTION OF THE DRAWINGS

These and/or other aspects will become apparent and more readily appreciated from the following description of the exemplary embodiments, taken in conjunction with the accompanying drawings, in which.

DETAILED DESCRIPTION OF THE EXEMPLARY EMBODIMENTS

Figure 1:
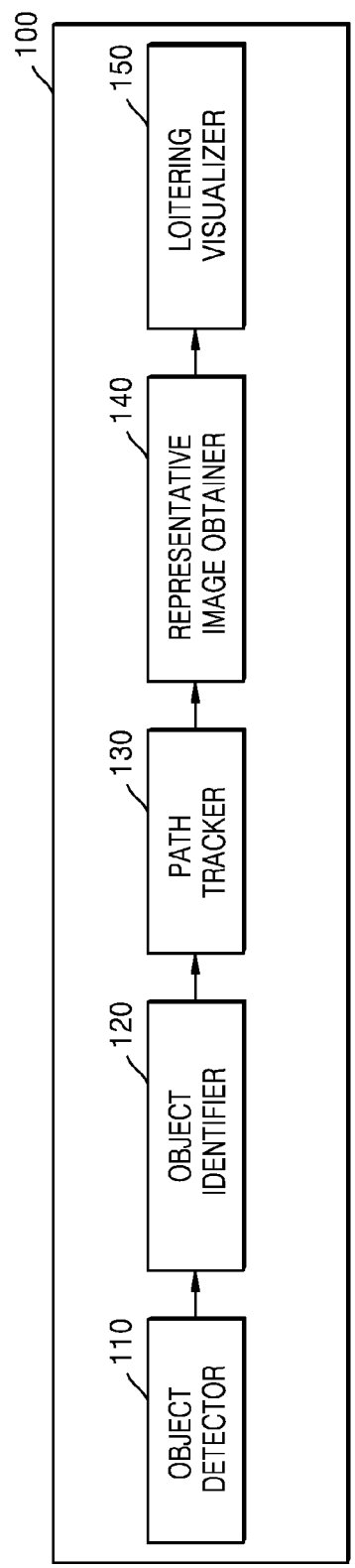
FIG. 1 illustrates a structural configuration of a loitering visualization apparatus, according to an exemplary embodiment.

Reference will now be made in detail to exemplary embodiments which are illustrated in reference to the accompanying drawings, wherein like reference numerals refer to like elements throughout. In this regard, the present embodiments may have different forms and should not be construed as being limited to the descriptions set forth herein. Accordingly, the exemplary embodiments are merely described below, by referring to the drawings, to explain various aspects of the inventive concept. As used herein, the term "and/or" includes any and all combinations of one or more of the associated listed items. Expressions such as "at least one of", when preceding a list of elements, modify the entire list of elements and do not modify the individual elements of the list.

The following description and accompanying drawings are provided for better understanding of the inventive concept. In the following description, well-known functions or constructions are not described in detail if it is determined that they would obscure the inventive concept due to unnecessary detail.

The following description and drawings are not intended to restrict the scope of the inventive concept, and the scope of the inventive concept should be defined by the appended claims. The terms used in the following description are merely used to describe particular embodiments of the inventive concept and are not intended to limit the inventive concept.

FIG. 1 illustrates a structural configuration of a loitering visualization apparatus 100, according to an exemplary embodiment. FIGS. 2 through 6 illustrate a function of each element of the loitering visualization apparatus 100.

The loitering visualization apparatus 100 includes an object detector 110, an object identifier 120, a path tracker 130, a representative image obtainer 140, and a loitering visualizer 150. Additionally, the loitering visualization apparatus 100 may further include a video summarizer (not illustrated).

The object detector 110 detects at least one moving object that appears continuously or stays for a preset period of time or longer in a particular area of an input image, by using an object loitering detection method. Here, a certain object appears more than a predetermined number of times for the preset period of time may be detected as the at least one moving object that appears continuously or stays for the preset period of time or longer. Also, the input image may be a collection of still images or a moving image. The object loitering detection method is a method of sequentially detecting a path in which an object loiters in a particular area. A loitering trace may be displayed on a single screen, that is, a single image frame.

Figure 2:
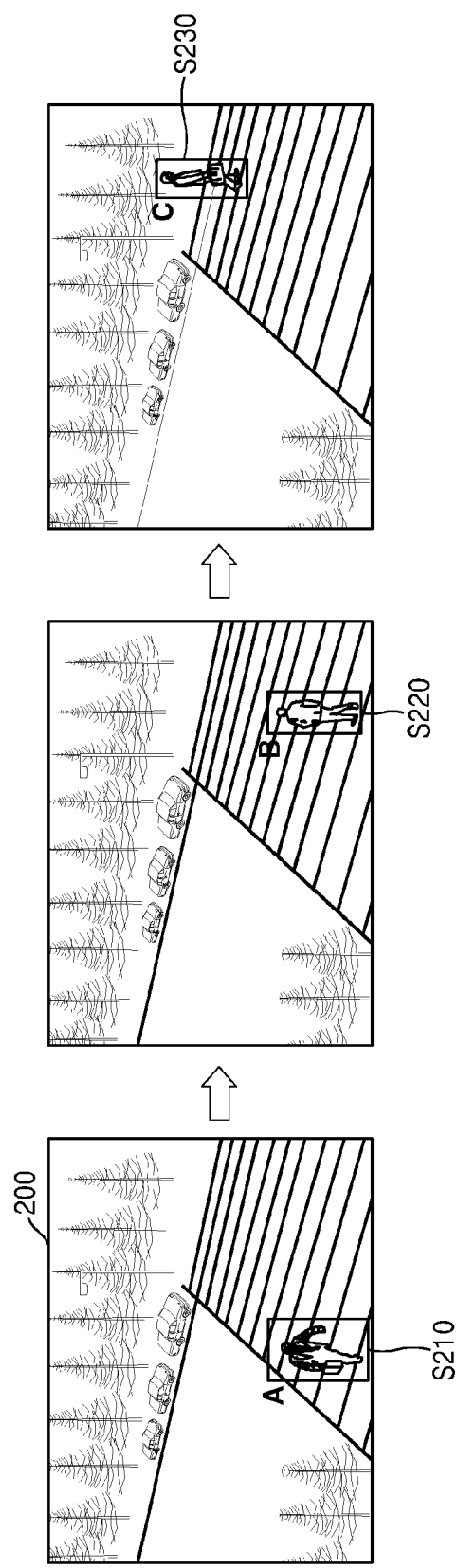
FIG. 2 illustrates detecting a particular moving object according to time, which is performed by the loitering visualization apparatus, according to an exemplary embodiment.

FIG. 2 illustrates detecting a particular moving object from an input image 200 according to time, which is performed by the object detector 110, according to an exemplary embodiment It is identified that the particular moving object at a point A in S210 is extracted from the input image 200 at a time of t1, the particular object at a point B in S220 is extracted from the input image 200 at a time of t2, and the particular moving object at a point C in S230 is extracted from the input image 200 at a time of t3.

The object identifier 120 assigns an identifier to a detected moving object. For example, referring to FIG. 2, when the object detector 110 first detects the moving object at the point A in S210 at the time t1, the object detector 110 may assign an identifier ID#1 to the detected moving object.

The path tracker 130 is configured to track a path of at least one moving object with an identifier. Referring to FIG. 2, the path tracker 130 tracks a path via which the detected moving object has passed through the point A in S210 at the time t1, the point B in S220 at the time t2, and the point C at the time t3 in S230, by tracking the detected moving object with the identifier ID#1.

The representative image obtainer 140 obtains a representative still image of the detected moving object in each time period, while the path tracker 130 tracks a path of the detected moving object with the identifier. As an example, representative still images respectively in a time period from 9:00:00 to 9:05:00, in a time period from 9:05:01 to 9:10:00, and in a time period from 9:10:01 to 9:15:00 are obtained. In this case, the representative still images of the detected moving object may be in the form of at least one of a front view, a side view and a rear view of the detected moving object.

Figure 4:
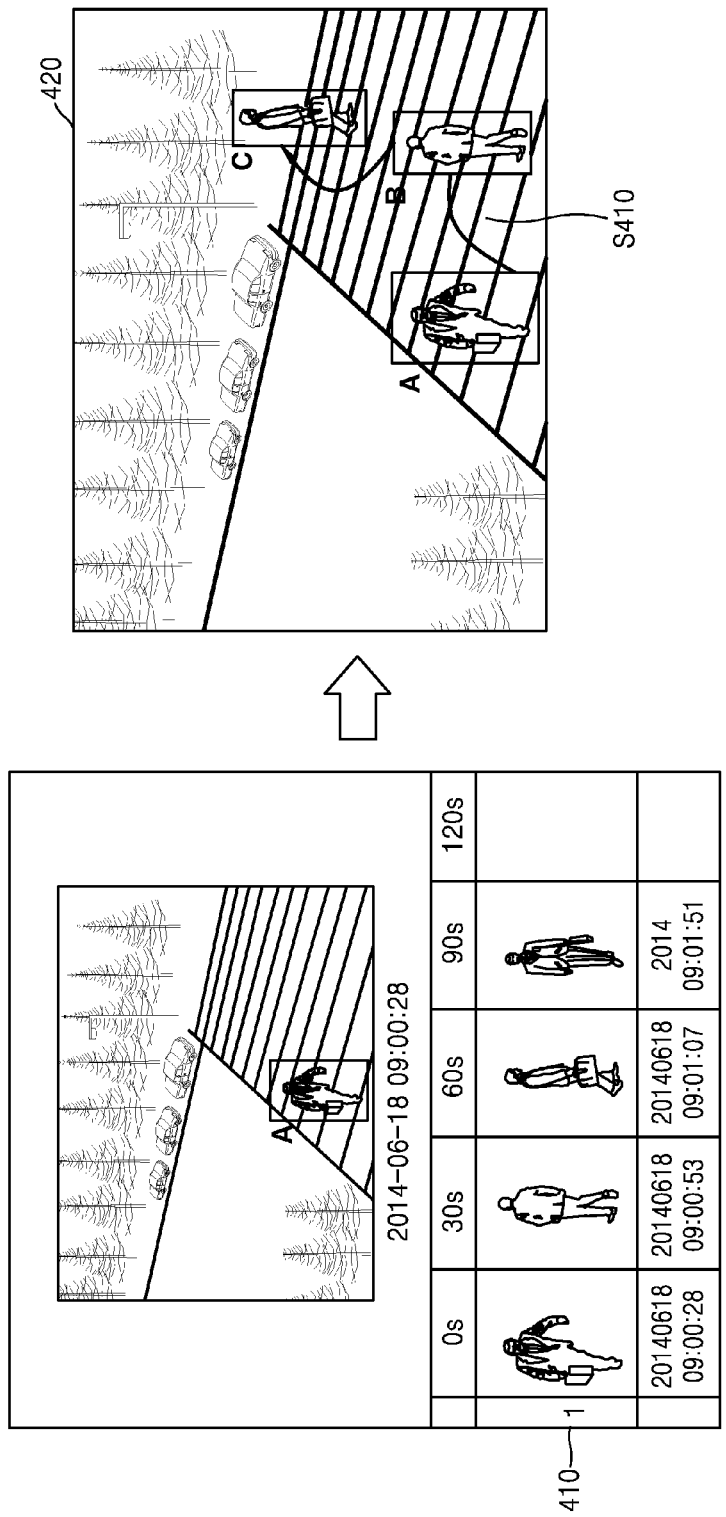
FIGS. 4 and 5 illustrate video summaries and displaying a loitering path of at least one moving object, which is performed by the loitering visualization apparatus, according to an exemplary embodiment.

Referring to FIGS. 2 and 4, a first still image obtained when the moving object is detected at the point A in S210 at the time t1 of 09:00:28 may be set as a representative still image in the time period from 9:00:00 to 9:05:00, a second still image obtained when the moving object is detected at the point B in S220 at the time t2 of 09:00:53 may be set as a representative still image in the time period from 9:05:00 to 9:10:00, and a third still image obtained when the moving object is detected at the point C in S230 at the time t3 of 09:01:07 may be set as a representative still image in the time period from 9:10:01 to 9:15:00.

The loitering visualizer 150 collects the representative still images each obtained in each time period with respect to each moving object with the identifier and displays the representative still images in an order of time. Referring to FIG. 2, the loitering visualizer 150 displays the first to third still images as obtained in the above-described manner, in an order of time.

Figure 5:
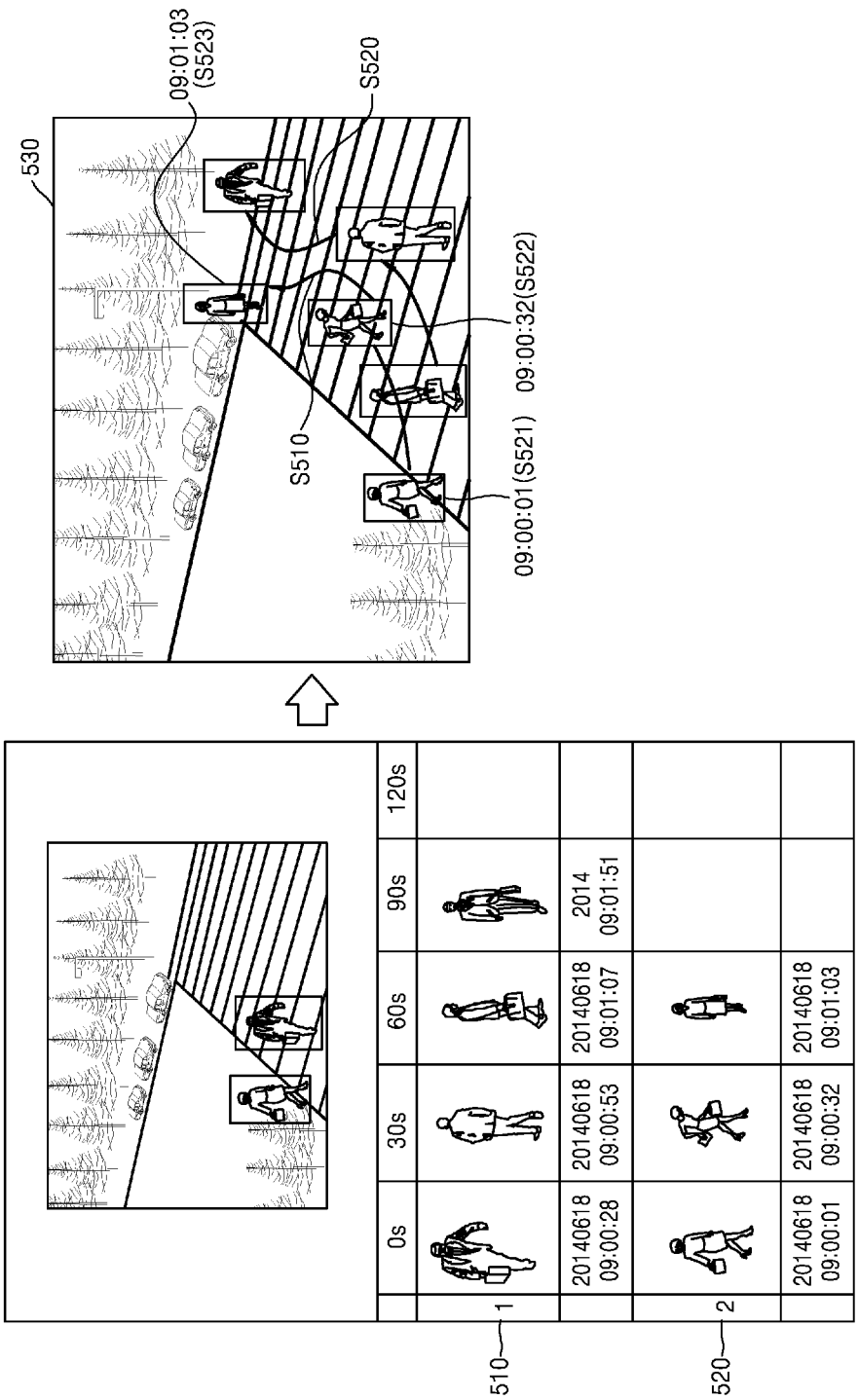

Referring to FIGS. 4 and 5, the loitering visualizer 150 collects and displays in an order of time representative still images each obtained in each time period with respect to each moving object with an identifier. For example, the loitering visualizer 150 may display representative still images of a moving object 410 or 510 to which an identifier ID#1 is assigned and representative still images of a moving object 520 to which an identifier ID#2 is assigned, in an order of time. The loitering visualizer 150 may provide identification information, which may identify an object, to be displayed in each representative still image obtained in each time period.

Figure 3:
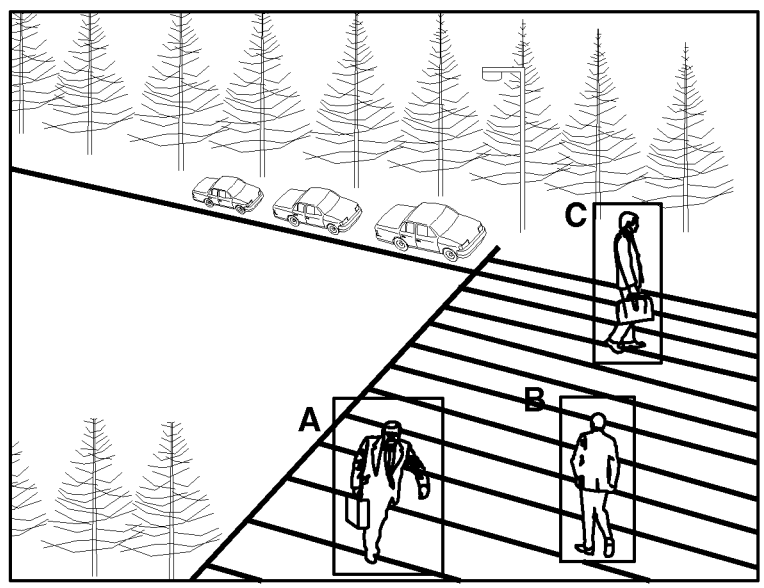
FIG. 3 illustrates displaying loitering of at least one moving object in the form of a video summary by using representative still images extracted in respective time periods, which is performed by the loitering visualization apparatus, according to an exemplary embodiment.

The loitering visualization apparatus 100 may further include the video summarizer (not illustrated) for generating a video summary based on the collected representative still images obtained in respective time periods with respect to at least one moving object that is assigned an identifier. The video summarizer may be included in the loitering visualizer 150. FIG. 3 illustrates display of loitering of at least one moving object in the form of a video summary by using representative still images obtained in the respective time periods, which is performed by the loitering visualization apparatus 100, according to an exemplary embodiment. Referring to FIGS. 2 and 3, the video summarizer displays images of the detected at least one moving object respectively included in the representative still images together on a single screen, that is, a single image or single image frame. Various methods may be employed to generate the video summary. According to an exemplary embodiment, the video summarizer may select one of the three representative still images shown in FIG. 2, extracts only a portion of the detected moving object from each of the other two representative still images, and merges the extracted portions of the detected moving object with the selected one of the three representative still images.

FIG. 4 illustrates that the video summarizer displays images of the detected moving object 410, respectively included in the representative still images, together on a single screen 420, that is, a single image or single image frame, and FIG. 5 illustrates that the video summarizer displays images of two moving objects 510, 520, respectively included in the representative still images, together on a single screen 530. Here, the single screen 530 may be an image generated by combining six different still images. As described above in reference to FIGS. 2 and 3, in order to display six different still images of two moving objects 510, 520 captured at six different time points on the single screen 530 as a single image frame, various methods may be employed. According to an exemplary embodiment, the video summarizer selects one of the six still images, extracts only a portion of the moving object 510 or 520 from each of the other five still images, and merges the extracted portions of the moving object 510 or 520 with the selected one of the six still images.

Additionally, the video summarizer may be configured to further display a moving trajectory in S410 shown in FIG. 4 and moving trajectories in S510 and S520 shown in FIG. 5 for showing a path of a moving object by using representative still images obtained in respective time periods with respect to each object with an identifier. In this case, the video summarizer may be configured to display a path of a moving object in an order of time. Alternatively, the video summarizer may be configured to display time in S521, S522, and S523, at which a representative still image is extracted, on the representative still image of the moving object in each time period.

Referring to FIG. 5, an example of displaying a time of 09:00:01 in S521, a time of 09:00:32 in S522, and a time of 09:01:03 in S523, at which representative still images are extracted, on the representative still images of the moving object 520, to which the identifier ID#2 is assigned is shown, respectively.

Figure 6:
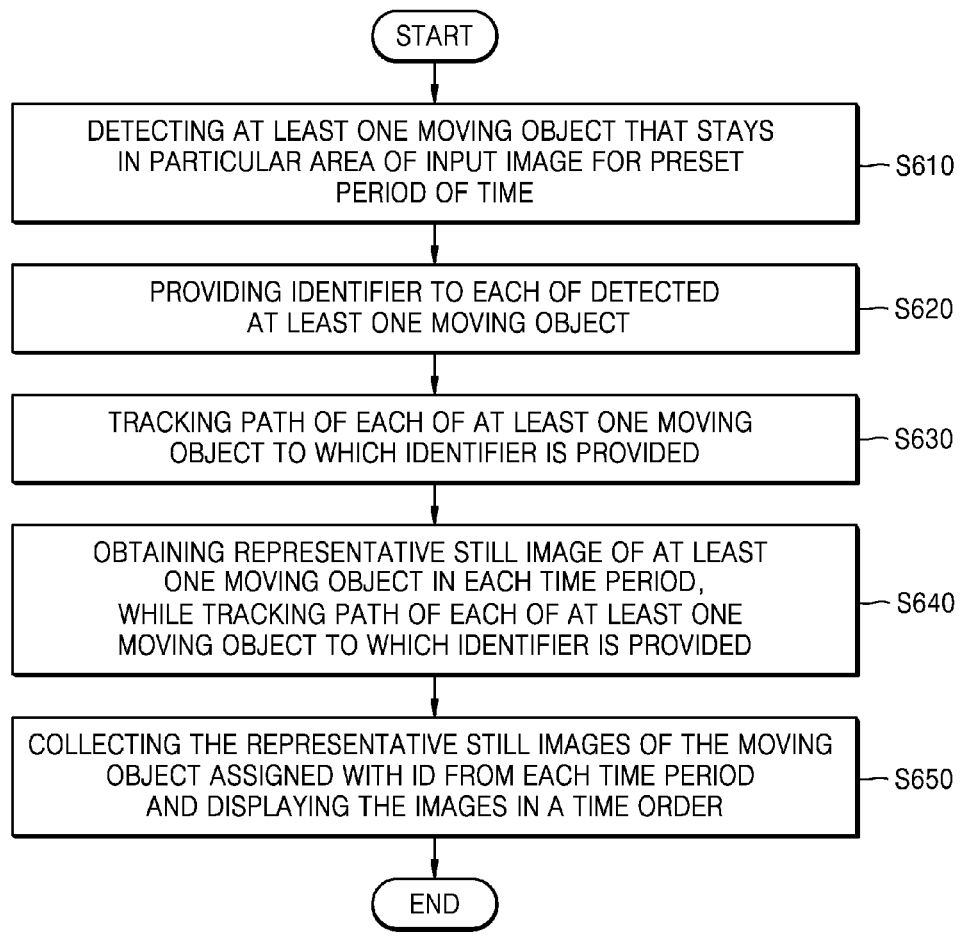
FIG. 6 is a flowchart of a loitering visualization method, which is performed by the loitering visualization apparatus, according to an exemplary embodiment.

FIG. 6 is a flowchart of a loitering visualization method, which is performed by a loitering visualization apparatus, according to an exemplary embodiment. The loitering visualization apparatus may be implemented in a digital video recorder (DVR), a digital video disc (DVD), a network video recorder (NVR), a smartphone, a thin terminal, a hand-held terminal, an image processing apparatus that includes a monitoring camera, or an image playback apparatus.

In operation S610, the loitering visualization apparatus detects at least one moving object that appears continuously or stays in a particular area of a received input image or an input image that is being photographed for a preset period of time.

According to an exemplary embodiment, if at least one moving object that has been in a particular area for a time period is detected, the detected at least one moving object may be further displayed in the form of a rectangular box in S210, S220, and S230 shown in FIG. 2. Additionally, if the at least one moving object loiters in the particular area for a preset period of time, for example, for 10 seconds or more, each time at which the at least one moving object loiters in the particular area in a particular period of time may be stored. An area in which a fire has occurred, an area in which an accident has occurred, or an area in which monitoring is necessary may be set as a particular area.

If a parking lot is set as a particular area, at least one moving object that appears continuously or stays near a stolen vehicle for a particular period of time or more, for example for 30 minutes or more may be detected.

In operation S620, an identifier is provided to each of the detected at least one moving object. According to an exemplary embodiment, a path of loitering of the at least one moving object may be tracked by identifying each of the at least one moving object.

In operation S630, a path of each of the at least one moving object with an identifier is tracked. In operation S640, a representative still image of the at least one moving object in each time period is obtained. Then, in operation S650, the representative still image obtained in each time period with respect to each of the at least one moving object is collected and displayed in an order of time.

According to an exemplary embodiment, respective representative still images, obtained in respective time periods with respect to a moving object provided with an identifier, are collected and displayed in an order of time. Thus, information about the identifier, information about time points at which the respective representative still images are collected, or the like may be displayed in the form of an icon.

According to another exemplar embodiment, representative still images obtained in respective time periods with respect to a moving object with respectfully identifiers are collected and displayed in the form of a video summary. In this case, a path of the moving object may be further displayed.

As described above, according to the above exemplary embodiments, a loitering visualization apparatus may track a path of a moving object of which loitering is detected in an order of time. Thus, even when a plurality of moving objects that are loitering in the scene are detected, information about each moving object may be easily analyzed.

In addition, the above exemplary embodiments can also be implemented through computer-readable code/instructions in/on a medium, e.g., a computer-readable medium, to control at least one processing element to implement any above-described embodiment. The medium can correspond to any medium/media permitting the storage and/or transmission of the computer-readable code.

The computer-readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream according to one or more exemplary embodiments. The media may also be a distributed network, so that the computer-readable code is stored/transferred and executed in a distributed fashion. Furthermore, the processing element could include a processor or a computer processor, and processing elements may be distributed and/or included in a single device.

At least one of the components represented by a block as illustrated in FIG. 1 may be embodied as various numbers of hardware, software and/or firmware structures that execute respective functions described above, according to an exemplary embodiment. For example, at least one of these components may use a direct circuit structure, such as a memory, processing, logic, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Also, at least one of these components may further include a processor such as a central processing unit (CPU) that performs the respective functions, a microprocessor, or the like. Two or more of these components may be combined into one single component, element or unit which performs all operations or functions of the combined two or more components, elements of units. Also, at least part of functions of at least one of the components may be performed by another of these components. Further, although a bus is not illustrated in the above block diagrams, communication between the components, elements or units may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

It should be understood that the exemplary embodiments described therein should be considered in a descriptive sense only and not for purposes of limitation. Descriptions of features or aspects within each embodiment should typically be considered as available for other similar features or aspects in other embodiments.

While a plurality of exemplary embodiments have been described with reference to the drawings, it will be understood by those of ordinary skill in the art that various changes in form and details may be made therein without departing from the spirit and scope of the inventive concept as defined by the following claims.

What is claimed is:

1. A method of visualizing loitering objects, the method comprising:
  detecting at least one object determined to have been in a selected area of an input image for a preset time period;
  obtaining representative still images of each of the detected at least one object in respective time periods during the preset time period; and
  displaying the representative still images in a time order in a screen, and generating a video summary in which images of each of the detected at least one object, respectively included in the representative still images, are displayed together on a single image in another screen, wherein the generating the video summary comprises displaying a moving trajectory indicating a path of the object by using the representative still images obtained in respective time periods with respect to the object, wherein the displaying the representative still images comprises displaying, in the time order, the representative still images along with time information which respectively indicates time points when the representative still images are captured by a camera, and wherein the generating the video summary comprises displaying the video summary in which the representative still images along with time information which respectively indicates time points when the representative still images are captured by a camera are displayed, the representative still images along with time information displayed in the video summary in another screen being the same as the representative still images along with time information displayed in the time order in the screen.

2. The method of claim 1, further comprising assigning an identifier to each of the detected at least one object,
wherein the identifier is displayed along with each of the detected at least one object on the representative still images or on the single image of the video summary.

3. The method of claim 2, further comprising tracking a path of each of the detected at least one object to which the identifier is assigned,
wherein the obtaining the representative still images is performed while tracking the path of each of the at least one object.

4. The method of claim 1, further comprising assigning an identifier to each of the detected at least one object,
wherein the identifier is displayed along with each of the detected at least one object on the representative still images.

5. The method of claim 1,
wherein the generating the video summary comprises tracking a path of each of the detected at least one object in the time order, and indicating the path on the single image.

6. The method of claim 5, further comprising assigning an identifier to each of the detected at least one object, and indicating the identifier on the single image.

7. The method of claim 1,
wherein, in the generating the video summary, the images of each of the detected at least one object respectively included in the representative still images are displayed on the single image with indication of the time order.

8. The method of claim 1, wherein each of the representative still images displays at least one of a front view, a side view, and a rear view of each of the at least one object.

9. The method of claim 1, wherein the detected at least one object is at least one object which has appeared more than a predetermined number of times in the selected area for the preset time period.

10. An apparatus for visualizing loitering objects, the apparatus comprising at least one processor to implement:
an object detector configured to detect at least one object determined to have been in a selected area of an input image for a preset time period;
an image obtainer configured to obtain representative still images of each of the detected at least one object in respective time periods during the preset time period; and a loitering visualizer configured to display the representative still images in a time order in a screen, and generate a video summary in which images of each of the detected at least one object, respectively included in the representative still images, are displayed together on a single image with indication of the time order in another screen, wherein the loitering visualizer displays a moving trajectory indicating a path of the object by using the representative still images obtained in respective time periods with respect to the object, wherein the loitering visualizer displays, in the time order, the representative still images along with time information which respectively indicates time points when the representative still images are captured by a camera, and wherein the loitering visualizer displays the video summary in which the representative still images along with time information which respectively indicates time points when the representative still images are captured by a camera are displayed, the representative still images along with time information displayed in the video summary in another screen being the same as the representative still images along with time information displayed in the time order in the screen.

11. The apparatus of claim 10, further comprising an object identifier configured to assign an identifier to each of the detected at least one object,
wherein the loitering visualizer is further configured to display the identifier along with each of the detected at least one object on the representative still images or on the single image of the video summary.

12. The apparatus of claim 11, further comprising a path tracker configured to track a path of each of the detected at least one object to which the identifier is assigned,
wherein the image obtainer is configured to obtain the representative still images while the path tracker tracks a path of each of the at least one object.

13. The apparatus of claim 10, further comprising an object identifier configured to assign an identifier to each of the detected at least one object,
wherein the loitering visualizer is further configured to display the identifier along with each of the detected at least one object on the representative still images.

14. The apparatus of claim 10,
wherein the loitering visualizer is further configured to track a path of each of the detected at least one object in the time order, and indicate the path on the single image.

15. The apparatus of claim 14, further comprising an object identifier configured to assign an identifier to each of the detected at least one object,
wherein the loitering visualizer is further configured to indicate the identifier on the single image.

16. The apparatus of claim 10,
wherein, in the generating the video summary, the loitering visualizer is configured to display indication of the time order along with the images of each of the detected at least one object on the single image.

17. The apparatus of claim 10, wherein each of the representative still images displays at least one of a front view, a side view, and a rear view of each of the at least one object.

18. The apparatus of claim 9, wherein the detected at least one object is at least one object which has appeared more than a predetermined number of times in the selected area of the input image for the preset time period.

\* \* \* \* \*